(12) United States Patent
Althaus et al.

(10) Patent No.: US 7,654,751 B2
(45) Date of Patent: Feb. 2, 2010

(54) ELECTRO-OPTICAL DATA TRANSMISSION ARRANGEMENT, AS WELL AS METHOD FOR ITS CONFIGURATION

(75) Inventors: Hans Ludwig Althaus, Lappersdorf (DE); Josef Wittl, Parsberg (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/201,560

(22) Filed: Aug. 29, 2008

(65) Prior Publication Data

US 2009/0180743 A1    Jul. 16, 2009

(30) Foreign Application Priority Data

Jan. 14, 2008  (DE)  ............... 10 2008 004 224

(51) Int. Cl.
*G02B 6/43* (2006.01)
*H04B 10/12* (2006.01)

(52) U.S. Cl. ........................................ 385/89; 398/140
(58) Field of Classification Search ...................... None
See application file for complete search history.

(56) References Cited

U.S. PATENT DOCUMENTS

| 6,398,425 | B2 * | 6/2002 | Williams et al. ............... 385/89 |
| 7,269,321 | B2 * | 9/2007 | Morris et al. ................ 385/115 |
| 2001/0040714 | A1 | 11/2001 | Sundaram et al. |
| 2006/0034609 | A1 | 2/2006 | Morris et al. |

FOREIGN PATENT DOCUMENTS

EP    1202480    5/2002

\* cited by examiner

*Primary Examiner*—Omar Rojas

(57) ABSTRACT

The invention relates to an electro-optical data transmission arrangement with an optical multicore fiber, on the respective end faces of which an electro-optical transducer is arranged, wherein at least one of the electro-optical transducers consists of several segments. The electro-optical data transmission arrangement allows high data transmission rates and broad tolerances in the manufacture.

21 Claims, 3 Drawing Sheets

ELECTRO-OPTICAL DATA TRANSMISSION ARRANGEMENT, AS WELL AS METHOD FOR ITS CONFIGURATION

CROSS-REFERENCE TO RELATED APPLICATIONS

This application claims priority to a German application having serial number 10 2008 004 224.2, filed on Jan. 14, 2008, entitled "ELECTRO-OPTICAL DATA TRANSMISSION DEVICE AND METHOD OF CONFIGURATION THEREOF", which is hereby incorporated herein by reference in its entirety.

BACKGROUND OF THE INVENTION

The invention relates to an electro-optical data transmission arrangement with an optical multicore fiber, on the respective end faces of which an electro-optical transducer is arranged, wherein at least one of the electro-optical transducers consists of several segments. The electro-optical data transmission arrangement allows high data transmission rates and broad tolerances in the manufacture.

In known electro-optical data transmission arrangements with high bit rates, thin fibers with diameters smaller than 100 μm and small photodiodes that are smaller than 300 μm are used for physical reasons. These small dimensions require high precision during the manufacture in order to efficiently coupled and decouple light. It is also known to use Polymer Optical Fibers (POFs) with diameters in the millimeter range that allow broad tolerances in the manufacture. Due to their physical properties, POFs are limited to transmission rates below 100 Mbit per second and transmission distances up to 100 m in mass applications.

There also exist multicore fibers (MCFs) that consist of a large number of individual thin fibers. Despite their comparatively large overall diameter, MCFs have a very good mechanical flexibility. In known applications such as illumination engineering, endoscopy and data transmission, all individual fibers are preferably used for transmission purposes. In known data transmission arrangements via an MCF, the diameter of the transmission light beam has a size that is comparable to the diameter of the MCF. The emerging light is incident on a photodiode that also has a size similar to the diameter. In the image transmission via an MCF, the respective image to be transmitted is projected on the total input cross section of the MCF and each individual fiber transmits one pixel to the fiber output in the correct position. The pixels are outcoupled from the individual fibers and assembled into an image, illustrated on a diffusing screen or displayed on an electro-optical image sensor. The image sensor may consist of several segments, namely a matrix or a line with light-sensitive cells.

SUMMARY OF THE INVENTION

In one embodiment of the present invention, an electro-optical data transmission arrangement is provided with an optical multicore fiber that consists of at least two individual fibers or comprises at least two individual fibers, but may also comprise a large number of individual thin fibers. One respective electro-optical transducer is arranged on the end faces of the optical multicore fiber, wherein at least one of the electro-optical transducers consists of several segments or comprises several segments. Each electro-optical transducer is connected to an electronic circuit arranged upstream or downstream thereof.

One of the electro-optical transducers may be a lightemitter or phototransmitter (transmitter), wherein the optical transmission source is driven by a driver IC. The lightemitter may comprise, in particular consist of, a single transmission segment but may also comprise or consist of several separately controlled segments, for example, lines or matrices with light-emitting cells. A corresponding two-dimensional arrangement is also referred to as an array. One or more segments may be activated for the data transmission.

The other electro-optical transducer may be a lightreceiver or photoreceiver (receiver) that is composed of two or more segments.

Suitable multi-segment receivers may be image sensors or multi-selection photodiodes, in which the segments are arranged in the form of matrices (arrays) or lines with light-sensitive cells. However, only the segment or the segments, via which an evaluable signal can be transferred, may be activated for the data transmission. This means that only a few individual fibers of the entire fiber bundle may be used during the transmission.

The electro-optical transducers may also contain phototransmitter segments and photoreceiver segments such that a bidirectional data transmission may be ensureable. These phototransmitter and photoreceiver segments may be arranged alternately on the transducer. It may also suffice to use only a few individual fibers of the entire fiber bundle for the operation of such an arrangement.

Only a few or individual fibers of the entire fiber bundle may be used for the data transmission lightemitter (transmitter)—multicore fiber—lightreceiver (receiver), wherein the light of these individual fibers may only be incident on a few segments of the lightreceiver on the receiving end.

Arrangements of the above-described type may allow broad tolerances in the manufacture of the coupling elements between the fiber and the electro-optical transducer: an offset between the fiber end face and the electro-optical transducer may not impair the data transmission as long as at least one combination of transmitter segment—fiber—receiver segment ensures a data transmission. Consequently, a low-cost coupling of the fiber to the components may be realized.

The arrangement may furthermore be realized in such a way that the non-activated segments are switched off or short-circuited such that they consume little or no energy. The electric capacitance of the electro-optical transducer may be reduced if segments are switched off or short-circuited and such allows for a higher transmission bandwidth.

In a configuration process it may be determined which combination of transmitter and receiver segments is selected and activated for the data transmission. In a configuration step, the transmission qualities and the strength of the transmitted signal are determined for a number of combinations of transmitter and receiver segments. In another configuration step, the optimal combination of transmitter and receiver segments is activated for a data transmission. The optimal combination is the combination, for which the signal with the best transmission quality or the signal with the highest received power or the strongest transmitted signal was determined, wherein the detector surface to be activated should be as small as possible.

This configuration process needs to be carried out at least once during the initial start-up of the system, but may also be carried out anew during each restart of the system or breaks in the data transmission. Another optional configuration step may consist of storing and repeatedly using the activated combination of transmitter and receiver segments for subsequent data transmissions.

In another embodiment, the received light level is evaluated (monitor function) and the light power of the transmitter is corrected or readjusted and reduced to the required minimum via a backward channel. Even at the smallest active detector surface possible for the given minimum, the light power of the transmitter should just suffice for transmitting an evaluable signal. Another criterion for reducing the light power could be eye protection regulations.

Here the backward channel may be realized in a purely electric fashion, for example, by also connecting the phototransmitter and the photoreceiver, as well as the corresponding control electronics, to one another with electric lines in addition to the optical fiber. The backward channel may also be realized in the form of a radio transmission link. If each of the two electro-optical transducers contains phototransmitter and photoreceiver segments, the backward channel may also be realized optically by using the multicore fiber, wherein the required information is respectively transmitted to the other electro-optical transducer via the optical channel. In addition to the transmission of information for readjusting the light power, the backward channel may also be used for transmitting further data. In another embodiment, the system is realized asynchronously with a fast optical forward channel and an electrical or optical backward channel with low data transmission rate.

BRIEF DESCRIPTION OF THE FIGURES

Embodiments of the invention are described in greater detail below with reference to the enclosed drawings.

In these drawings.

DESCRIPTION OF EMBODIMENTS OF THE INVENTION

Embodiments of the invention are described below. However, the invention is not limited to a specifically described embodiment, but may also be suitably modified and altered. Within the scope of the invention, individual characteristics and combinations of characteristics of one embodiment may be suitably combined with characteristics and combinations of characteristics of another embodiment in order to arrive at other embodiments according to the invention.

Electro-optical components and their mechanical details were not illustrated because they are sufficiently known and not essential to this invention.

Figure 1:
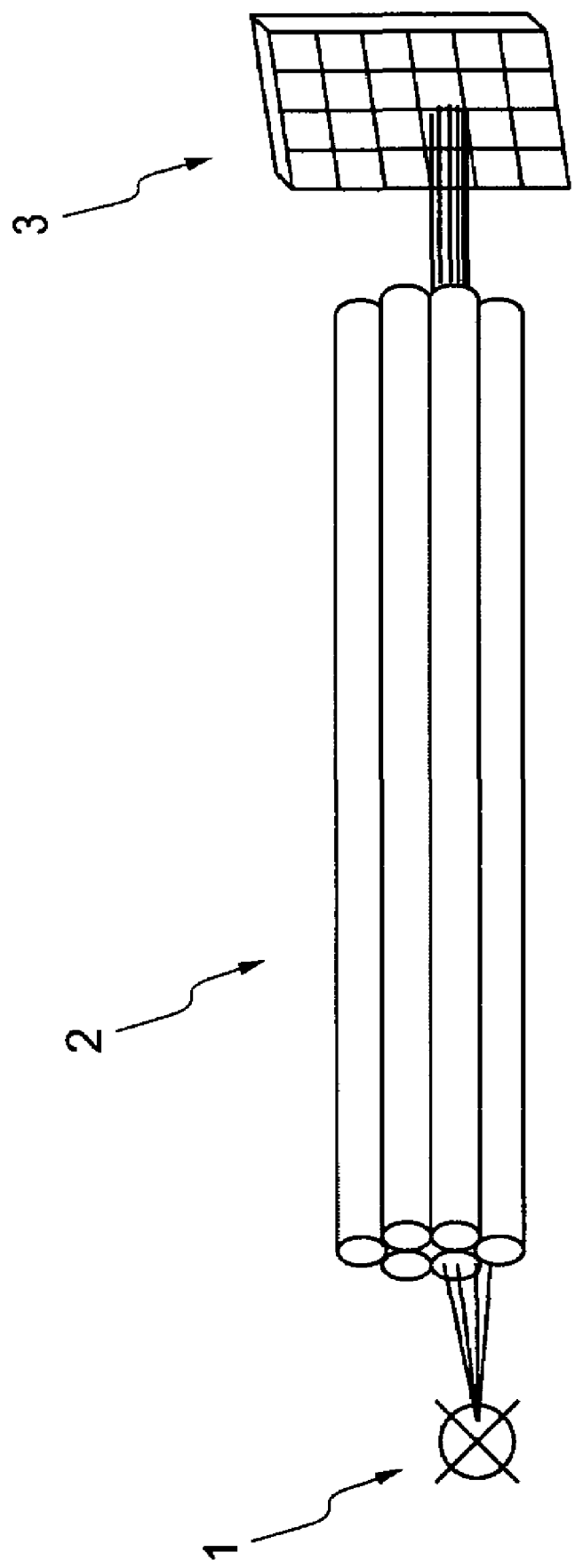
FIG. 1 shows a schematic illustration of a first embodiment of an electro-optical data transmission arrangement with a lightemitter, a multicore fiber and a lightreceiver that consists of several segments.

FIG. 1 shows an electro-optical data transmission arrangement with an electro-optical transducer in the form of a phototransmitter or lightemitter 1 that is arranged on one end face of an optical multicore fiber 2, as well as an electro-optical transducer in the form of a photoreceiver or lightreceiver 3 that comprises, in particular consists of, several segments and is arranged on the other end face of the optical multicore fiber 2. The phototransmitter 1 is also referred to as transmitter or optical transmitter. Semiconductor components such as, for example, LEDs (Light Emitting Diodes), RCLEDs, VCSEL diodes, FP lasers or DFB lasers may be used as phototransmitters.

It is preferred to use a transmission source that has directional emission characteristics such that coupling optics can be eliminated. In this case, the light beam is directly coupled into the multicore fiber and only one or a few individual fibers are illuminated. The photoreceiver 3 that comprises or consists of several segments is also referred to as receiver. Photoreceivers to be considered are, for example, multi-selection photodiodes, image sensors or Charge-Coupled Device (CCD) sensors used in digital photography or CMOS sensors with a suitable number of pixels. Only individual or a few fibers of the entire fiber bundle are used for the data transmission transmitter—multicore fiber—receiver, wherein the light of these fibers is only incident on a few segments (pixels) of the photoreceiver on the receiving end. The sensitivity of the arrangement with respect to installation tolerances decreases proportionally as the cross section of the electro-optical transducer increases in relation to the size of the multicore fiber. Instead of using a phototransmitter 1 that consists of only one segment, the phototransmitter may also be realized in the form of a multiple emitter that is arranged in an array-like fashion in another embodiment. This may make it possible to also compensate installation tolerances on the transmitter side during the operation.

Figure 2:
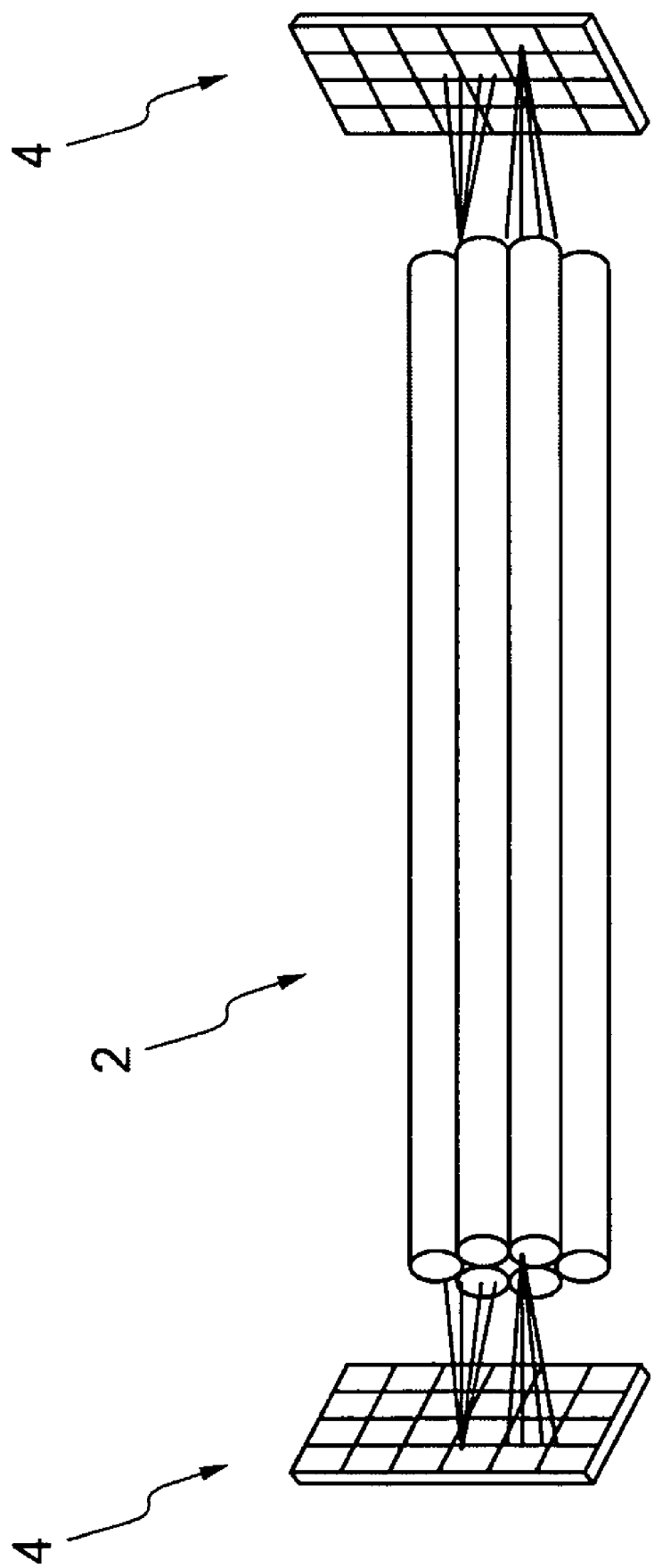
FIG. 2 shows a schematic illustration of another embodiment of a bidirectional electro-optical data transmission arrangement.

FIG. 2 shows another electro-optical data transmission arrangement with a transceiver array 4 that consists of several segments and is arranged on one end face of an optical multicore fiber 2, as well as another transceiver array 4 that consists of several segments and is arranged on the other end face of the optical multicore fiber. A transceiver array is an electro-optical transducer and contains segments with transmitter function, as well as elements with receiver function. Such a design allows a bidirectional operation of the electro-optical data transmission arrangement. At least one respective segment of each transceiver array serves as transmitter element and another segment serves as receiver element.

This data transmission arrangement may also be operated unidirectional.

Figure 3:
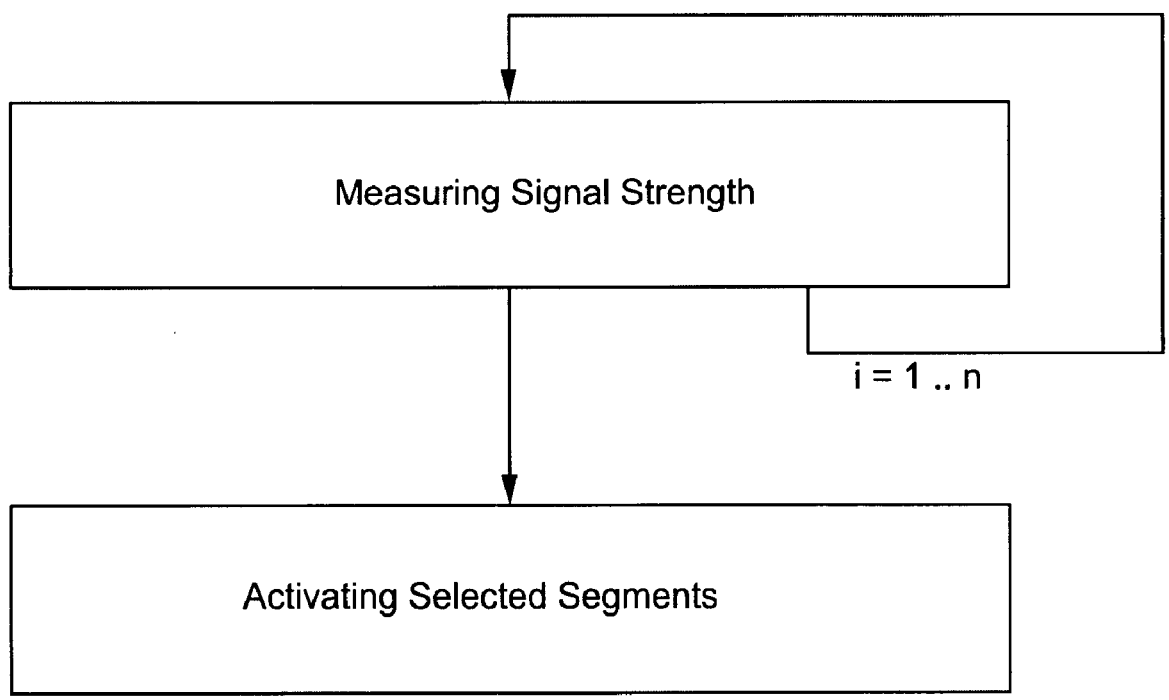
FIG. 3 shows a flow chart illustrating the method for configuring an inventive electro-optical data transmission arrangement.

FIG. 3 shows a flow chart that illustrates a method for configuring an inventive electro-optical data transmission arrangement. In a configuration step, the strength of the transmitted signal is determined for all or at least for a plurality of possible combinations of transmitter and receiver elements. For example, if the system comprises or consists of a phototransmitter element with one segment and a photoreceiver with n radiation-sensitive segments, the strength of the received signal needs to be determined n-times. If the phototransmitter also comprises or consists of several (m) segments and the photoreceiver comprises or consists of n segments, the strength of the received signal needs to be determined m-times (n−1), i.e. m·(n−1) times. It would also be conceivable to merely determine the transmission quality for a smaller number of combinations.

In another configuration step, the combination of transmitter and receiver segments, for which the strongest transmitted signal was determined, is activated for a data transmission. In order to obtain a sufficiently strong signal for the data transmission, e.g., a signal that lies above a predetermined threshold value and ensures, for example, a predetermined transmission quality, it may be necessary to activate two or more adjacent transmitter or receiver segments of the respective electro-optical transducer rather than only one transmitter or receiver segment. If the smallest suitable or possible number of segments is activated, only a small active surface consisting of several segments is realized.

In other embodiments, additional configuration steps may be carried out, for example, the non-activated transmitter and receiver segments are short-circuited. Consequently, these segments no longer participate in the optical transmission, do not restrict any circuit times and also do not introduce any parasitic capacitances into the system and the energy consumption also remains low. The transmission bandwidth increases as the capacitance of the detector decreases. Thus, one important objective of the configuration consists of only activating a few segments of the detector in order to realize a small active surface of the detector.

Furthermore, the selected combinations of transmitter and receiver segments may be stored and repeatedly used for subsequent data transmissions. Alternatively, the configuration of the system can be respectively repeated during breaks in the data transmission.

The embodiments of the electro-optical data transmission arrangement are suitable for all applications that comprise an optical transmission system. For example, they may also be used in systems that require high data rates such as mobile telephones or laptops, in which they may also serve for transmitting display information, images, graphics or even movies.

LIST OF REFERENCE SIGNS

1: Phototransmitter
2: Multicore fiber
3: Photoreceiver consisting of several segments
4: Transceiver array

The invention claimed is:

1. An electro-optical data transmission arrangement for transmitting optical data signals at a data transmission rate, the arrangement comprising:

an optical multicore fiber comprising a plurality individual optical fibers, the multicore fiber having first and second end faces, each of the individual fibers having first and second end faces, the first end face of the multicore fiber coinciding with the first end faces of the individual fibers, the second end face of the multicore fiber coinciding with the second end faces of the individual fibers;

first and second electro-optical transducers arranged on the first and second end faces, respectively, of the multicore fiber, wherein the first electro-optical transducer comprises at least one phototransmitter pixel and the second electro-optical transducer comprises at least one photoreceiver pixel, and wherein at least one of the electro-optical transducers comprises a plurality of pixels, wherein at least one phototransmitter transmits an optical data signal over the multicore fiber; and a strength device for determining a strength of the transmitted signal for a plurality of combinations of phototransmitter and photoreceiver pixels, wherein a combination of phototransmitter and photoreceiver pixels are activated for which a sufficiently strong transmitted signal is determined, and wherein non-activated phototransmitter and photoreceiver pixels are short-circuited.

2. The electro-optical data transmission arrangement according to claim 1, wherein the first and second electro-optical transducers comprise a plurality of phototransmitter pixels and a plurality of photoreceiver pixels, respectively.

3. The electro-optical data transmission arrangement according to claim 2, wherein the second electro-optical transducer comprises several pixels.

4. The electro-optical data transmission arrangement according to claim 1, wherein at least one of the first and second electro-optical transducers comprises both phototransmitter pixels and photoreceiver pixels.

5. The electro-optical data transmission arrangement according to claim 4, wherein at least the first electro-optical transducer comprises phototransmitter and photoreceiver pixels, the phototransmitter and photoreceiver pixels of the first electro-optical transducer are arranged alternately.

6. The electro-optical data transmission arrangement according to claim 1, wherein each electro-optical transducer is connected to an electronic circuit arranged upstream or downstream thereof.

7. The electro-optical data transmission arrangement according to claim 2, wherein an electrical or optical backward channel to the phototransmitter is provided.

8. The electro-optical data transmission arrangement according to claim 7, wherein the backward channel has a lower data transmission rate than the data transmission rate of the data transmission arrangement.

9. The electro-optical data transmission arrangement according to claim 2, wherein at least the first electro-optical transducer comprises several pixels, and wherein a subgroup of the pixels of the first electro-optical transducer is activated for the data transmission, the subgroup of pixels comprising less than all of the pixels of the first electro-optical transducer.

10. The electro-optical data transmission arrangement according to claim 2, wherein at least the first electro-optical transducer comprises several pixels, and wherein one or more of the pixels of the first electro-optical transducer are activated for data transmission to cause an evaluable signal to be transferred along the multicore fiber from the first end face of the multicore fiber to the second end face of the multicore fiber.

11. The electro-optical data transmission arrangement according to claim 4, wherein transmission qualities for a plurality of combinations of phototransmitter and photoreceiver pixels are determined in a configuration process, and wherein the combination of phototransmitter and photoreceiver pixels determined to have desired transmission qualities is activated for the data transmission.

12. The electro-optical data transmission arrangement according to claim 11, wherein the combination of phototransmitter and photoreceiver pixels that is activated is the combination that is determined to have transmission qualities indicating that the combination will allow an optical channel to exist in the multicore fiber in one direction.

13. The electro-optical data transmission arrangement according to claim 11, wherein the combination of phototransmitter and photoreceiver pixels that is activated is the combination that is determined to have transmission qualities indicating that the combination will allow first and second optical channels to exist in the multicore fiber for transmission of data in first and second directions, respectively, the first and second directions being opposite one another.

14. The electro-optical data transmission arrangement according to claim 11, wherein the combination of phototransmitter and photoreceiver pixels that is activated is the combination that is determined to have transmission qualities indicating that the combination will allow parallel transmission of two or more optical channels in one or more directions.

15. A method for configuring an electro-optical data transmission arrangement for transmitting optical data signals at a data transmission rate over an optical multicore fiber, the method comprising:

providing a multicore fiber comprising a plurality individual optical fibers, the multicore fiber having first and second end faces, each of the individual fibers having first and second end faces, the first end face of the multicore fiber coinciding with the first end faces of the individual fibers, the second end face of the multicore fiber coinciding with the second end faces of the individual fibers;

providing first and second electro-optical transducers arranged on the first and second end faces, respectively, of the multicore fiber, wherein the first electro-optical transducer comprises at least one phototransmitter pixel and the second electro-optical transducer comprises at least one photoreceiver pixel, wherein at least one of the electro-optical transducers comprises a plurality of pixels;

transmitting an optical data signal over the multicore fiber;

determining a strength of the transmitted signal for a plurality of combinations of phototransmitter and photoreceiver pixels;

activating the combination of phototransmitter and photoreceiver pixels for which a sufficiently strong transmitted signal was determined; and short-circuiting non-activated phototransmitter and photoreceiver pixels.

16. The method according to claim 15, wherein the combination of phototransmitter and photoreceiver pixels that is activated is a combination of phototransmitter and photoreceiver pixels that allow a transmission of an optical channel in one direction.

17. The method according to claim 15, wherein the combination of phototransmitter and photoreceiver pixels that is activated is the combination of phototransmitter and photoreceiver pixels that allow a transmission of an optical channel in a first direction and a transmission of another optical channel in a second direction that is opposite the first direction.

18. The method according to claim 15, wherein the combination of phototransmitter and photoreceiver pixels that is activated is the combination of phototransmitter and photoreceiver pixels that allows a parallel transmission of two or more optical channels in a first direction or in a first direction and a second direction.

19. The method according to claim 15, wherein the activated combination of phototransmitter and photoreceiver pixels is stored in a memory device and repeatedly used for subsequent data transmissions.

20. The method according to claim 15, wherein the transmitting, determining and activating steps are repeated during breaks in the data transmission.

21. The method according to claim 15, further comprising: after the activation step, readjusting a light level of at least one phototransmitter pixel to a required minimum light level.

* * * * *